United States Patent
Kim

(10) Patent No.: US 10,042,464 B2
(45) Date of Patent: Aug. 7, 2018

(54) DISPLAY APPARATUS INCLUDING TOUCHSCREEN DEVICE FOR DETECTING PROXIMITY TOUCH AND METHOD FOR CONTROLLING THE SAME

(71) Applicants: Yong-Chul Kim, Goyang (KR); RNDPLUS CO., LTD., Goyang (KR)

(72) Inventor: Yong-Chul Kim, Goyang (KR)

(73) Assignees: Yong-Chul Kim, Goyang (KR); RNDPLUS CO., LTD., Goyang (KR)

( * ) Notice: Subject to any disclaimer, the term of this patent is extended or adjusted under 35 U.S.C. 154(b) by 95 days.

(21) Appl. No.: 15/181,617

(22) Filed: Jun. 14, 2016

(65) Prior Publication Data
US 2017/0315654 A1    Nov. 2, 2017

(30) Foreign Application Priority Data
Apr. 28, 2016  (KR) .................. 10-2016-0052138

(51) Int. Cl.
G06F 3/041      (2006.01)
G06F 3/044      (2006.01)

(52) U.S. Cl.
CPC ............ G06F 3/0416 (2013.01); G06F 3/044 (2013.01); G06F 3/0412 (2013.01)

(58) Field of Classification Search
CPC .................................................. G06F 3/0416
USPC .......................................................... 345/173
See application file for complete search history.

(56) References Cited

U.S. PATENT DOCUMENTS

| 2012/0065914 A1* | 3/2012 | Kiyose | G06F 3/0304 702/95 |
| 2014/0062963 A1* | 3/2014 | Matsushita | G06F 3/0421 345/175 |
| 2014/0097956 A1* | 4/2014 | Imamura | G06F 21/32 340/573.1 |
| 2015/0199071 A1* | 7/2015 | Hou | G06F 3/0416 345/175 |

* cited by examiner

*Primary Examiner* — Long D Pham
(74) *Attorney, Agent, or Firm* — Patent Office of Dr. Chung Park

(57) ABSTRACT

A touchscreen device includes: a touch sensing unit including a transmission module configured to transmit a touch measurement signal and a reception module configured to receive the touch measurement signal from the transmission module; a control unit configured to control the transmission module and the reception module and calculate a touch position according to an output signal of the touch sensing unit; a position indication unit disposed adjacent to the touch sensing unit and configured to emit visibly recognizable light; and a support member configured to support the touch sensing unit and the position indication unit. When the touch sensing unit senses a motion of a user in a sensing region, the control unit controls the position indication unit to emit light that is turned on and off to be visibly recognizable.

9 Claims, 5 Drawing Sheets

DISPLAY APPARATUS INCLUDING TOUCHSCREEN DEVICE FOR DETECTING PROXIMITY TOUCH AND METHOD FOR CONTROLLING THE SAME

CROSS-REFERENCE TO RELATED APPLICATION

This application claims the benefit of Korean Patent Application No. 10-2016-0052138, filed on Apr. 28, 2016, in the Korean Intellectual Property Office, the disclosure of which is incorporated herein in its entirety by reference.

BACKGROUND

1. Field

One or more embodiments relate to a touchscreen device, and more particularly, to a touchscreen device capable of sensing a user input operation in a space, a method for controlling the same, and a display apparatus.

2. Description of the Related Art

In addition to a keyboard or a mouse, a touchscreen is used as an input device. When a user puts his or her finger or an object at a desired position so as to select a specific position or a character displayed on a display device of a touchscreen, the touchscreen grasps the corresponding position to thereby allow the user to directly input a certain command through the display device.

The touchscreen is a combination of a general monitor screen and a touch panel. The touch panel generates a large number of rectangular grids on a screen by emitting invisible infrared light in horizontal and vertical directions, and grasps a position when a fingertip of a user or other object touches a certain grid. The touchscreen has evolved into a resistive touchscreen, and a capacitive touchscreen is being widely used.

The capacitive touchscreen determines a touch position by sensing a change in capacitance occurring when a finger of a user touches a touchscreen. However, in order to sense the touch position, the user has to touch the touchscreen with his or her finger.

Therefore, if many unspecified persons use capacitive touchscreens installed in subway stations, airports, hospitals, and the like, bacteria or contaminants attached to fingers of users may propagate through the touchscreens.

In particular, it is difficult to use the capacitive touchscreens at places (e.g., hospitals) requiring thorough sanitation. For example, serious sanitary problems may occur if a doctor who treats many patients uses the capacitive touchscreen.

Unlike the capacitive touchscreen, an infrared touchscreen does not require a direct touch on a touchscreen, and thus, sanitary problems may be solved. However, it is difficult for a user to recognize whether an input operation is performed in an accurate sensing region in the process of inputting a command through his or her motion in a space.

Furthermore, in the case of the infrared touchscreen, types of permissible input commands are simple. Hence, it is difficult to input various types of commands.

SUMMARY

One or more embodiments include a touchscreen device having a novel structure, a method for controlling the same, and a display apparatus.

One or more embodiments include a touchscreen device capable of sensing a position selected by a user without touching a display device with a finger of the user, a method for controlling the same, and a display apparatus.

One or more embodiments include a touchscreen device allowing a user to more easily recognize a position of a sensing region and a motion of an input operation, a method for controlling the same, and a display apparatus.

One or more embodiments include a touchscreen device allowing a user to input different types of commands through a plurality of touch sensing units, a method for controlling the same, and a display apparatus.

According to one or more embodiments, a touchscreen device includes: a touch sensing unit including a transmission module configured to transmit a touch measurement signal and a reception module configured to receive the touch measurement signal from the transmission module; a control unit configured to control the transmission module and the reception module and calculate a touch position according to an output signal of the touch sensing unit; a position indication unit disposed adjacent to the touch sensing unit and configured to emit visibly recognizable light; and a support member configured to support the touch sensing unit and the position indication unit, wherein, when the touch sensing unit senses a motion of a user in a sensing region, the control unit controls the position indication unit to emit light that is turned on and off to be visibly recognizable.

According to one or more embodiments, a display apparatus includes: a touchscreen device; an information processor configured to calculate and process a signal sensed by the touchscreen device; and a display device disposed spaced apart from the touchscreen device and configured to display an image according to an output signal of the information processor, wherein the touchscreen device includes: a touch sensing unit including a transmission module configured to transmit a touch measurement signal and a reception module configured to receive the touch measurement signal from the transmission module; a control unit configured to control the transmission module and the reception module and calculate a touch position according to an output signal of the touch sensing unit; a position indication unit disposed adjacent to the touch sensing unit and configured to emit visibly recognizable light; and a support member configured to support the touch sensing unit and the position indication unit, wherein, when the touch sensing unit senses a motion of a user in a sensing region, the control unit controls the position indication unit to emit light that is turned on and off to be visibly recognizable.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a touchscreen device, a method for controlling the same, and a display apparatus, according to embodiments, will be described with reference to the accompanying drawings.

Figure 1:
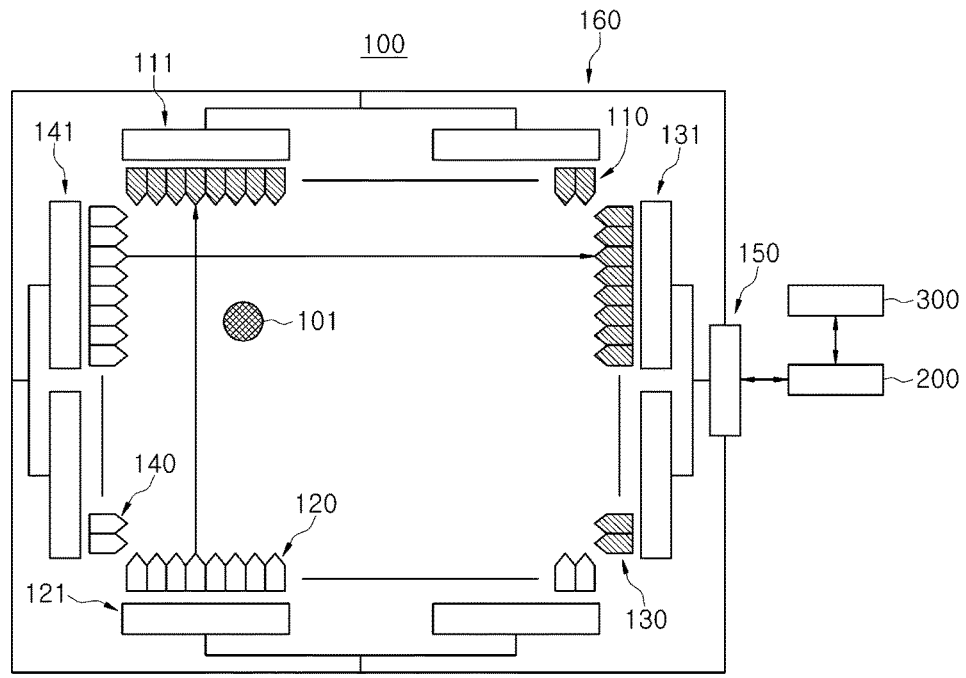
FIG. 1 is a diagram for describing a touchscreen device, a method for controlling the same, and a display apparatus, according to an embodiment.

FIG. 1 is a diagram for describing a touchscreen device, a method for controlling the same, and a display apparatus, according to an embodiment.

Referring to FIG. 1, the display apparatus according to the present embodiment may include a touchscreen device 100, an information processor 200, and a display device 300. The touchscreen device 100 may include a touch sensing unit 160, and a control unit 150 that controls the touch sensing unit 160 and sense a touch position according to an output signal of the touch sensing unit 160. The information processor 200 may calculate and process a signal sensed by the touchscreen device 100. The display device 300 may be disposed spaced apart from the touchscreen device 100 and may display an image according to an output signal of the information processor 200.

For example, the touchscreen device 100 senses an input operation of a user in a space spaced apart from the surface of the display device 300, not on the surface itself of the display device 300. The information processor 200 generates a control signal by processing a signal generated according to the input operation of the user. The display device 300 displays an image according to the control signal.

The touch sensing unit 160 of the touchscreen device 100 may include an X-axis reception module 110, an X-axis transmission module 120, an X-axis reception module driver 111, an X-axis transmission module driver 121, a Y-axis reception module 130, a Y-axis transmission module 140, a Y-axis reception module driver 131, and a Y-axis transmission module driver 141. The control unit 150 of the touchscreen device 100 may control the touch sensing unit 160 to calculate and sense the touch position.

The present embodiment is illustrated based on the direction (e.g., X-axis or Y-axis) with respect to the surface of the display device 300, but embodiments are not limited thereto. The touch position can be sensed even though the reception modules and the transmission modules are provided in various directions.

In addition, the touch sensing unit 160 is illustrated as including the X-axis reception module 110, the X-axis transmission module 120, the Y-axis reception module 130, and the Y-axis transmission module 140, but the reception module and the transmission module may be installed in only the X-axis or the Y-axis, as disclosed in Korean Patent Registration No. 10-1372423.

Under the control of the X-axis transmission module driver 121 and the Y-axis transmission module driver 141, the X-axis reception module 110 and the Y-axis reception module 120 of the touchscreen device 100 receive touch measurement signals (e.g., infrared signals) output by the X-axis transmission module 120 and the Y-axis transmission module 140 and sense a change in the infrared signals.

The control unit 150 may calculate coordinates of a position selected by the user by processing the infrared signals received from the X-axis reception module 110 and the Y-axis reception module 130. In addition to the coordinates of the position selected by the user, the control unit 150 may calculate a size (e.g., diameter) of the position selected by the user. For example, when the user touches a specific point 101 with his or her finger in a sensing space, the control unit 150 of the touchscreen device 100 may sense a touch position (or a size of a touch position) of the finger of the user on an X-Y plane by calculating a sensing region where the infrared signal is sensed and a non-sensing region where the infrared signal is not sensed, in the sense that the infrared signal is blocked by the finger of the user.

The touch of the user does not mean that the finger of the user contacts the screen of the display device 300, but may mean that the finger of the user is put in a space of the sensing region spaced apart from the display device 300. While the capacitive touchscreen can recognize the touch when the finger of the user contacts the display device or is very close to the display device, the infrared touchscreen device according to the present embodiment can sense the input operation of the user, i.e., the touch, even when the finger of the user is put at a position spaced apart from the display device 300. That is, the input operation of the user can be sensed at a position spaced apart by a distance that does not influence the capacitance in the capacitive touchscreen, not a distance that influences the capacitance.

In other words, the touchscreen device 100 may sense a point selected by the user in a space between the X-axis and Y-axis transmission modules 120 and 140 and the X-axis and Y-axis reception modules 110 and 130.

The touchscreen device 100 may be configured in various forms so as to sense the input operation of the user. For example, the transmission module and the reception module are illustrated in FIG. 1 as facing each other, but the transmission module and the reception module may be alternately arranged on both sides.

In addition, the touchscreen device 100 may use various scan methods and various control methods so as to accurately sense the position selected by the user.

Figure 2:
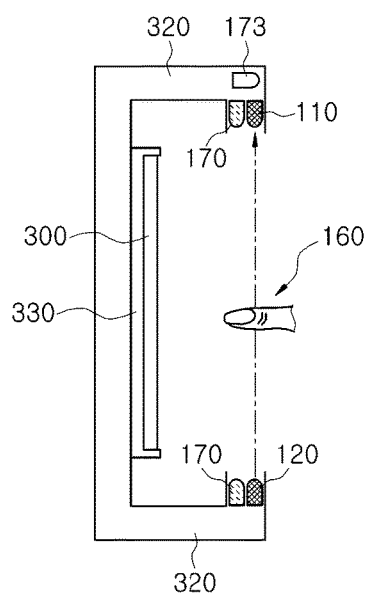
FIG. 2 is a sectional view for describing a touchscreen device, a method for controlling the same, and a display apparatus, according to an embodiment.

FIG. 2 is a sectional view for describing a touchscreen device, a method for controlling the same, and a display apparatus, according to an embodiment.

Referring to FIG. 2, the touchscreen device 100 according to the present embodiment may include a touch sensing unit 160 and a position indication unit 170. The touch sensing unit 160 may include an X-axis transmission module 120 and an X-axis reception module 110 disposed in front of a display device 300. The position indication unit 170 may be disposed between the touch sensing unit 160 and the display device 300. In the embodiment of FIG. 2, the Y-axis transmission module 140 and the Y-axis reception module 130 of FIG. 1 are not illustrated for convenience. In practice, the Y-axis transmission module 140 and the Y-axis reception module 130 need not be necessarily provided in the touchscreen device 100.

When the front side of the display device 300 is assumed as X-Y axis, the touch sensing unit 160 need not be necessarily disposed on Z-axis. However, it is desirable that the touch sensing unit 160 be disposed at a position where the user can input the touch while viewing the display device 300.

The position indication unit 170 may be disposed adjacent to the touch sensing unit 160 and may be supported by a support member 320. The touch sensing unit 160 may also be supported by the support member 320.

The position indication unit 170 may form a light screen. The light screen may be configured such that light is emitted in a certain space in a screen form or a planar form so that, when an object is located in the corresponding space, the light is irradiated on the surface of the object. The light screen may be configured such that the light is not or hardly seen before the object is located, but the light is seen on the surface of the object when the object is located.

Figure 3:
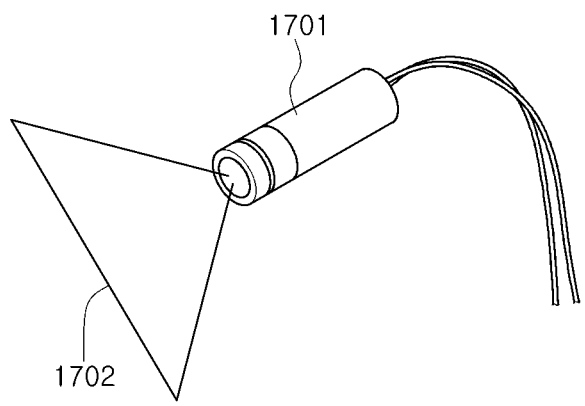
FIG. 3 is a diagram for describing a line laser module in the touchscreen device, the method for controlling the same, and the display apparatus, according to an embodiment.

The position indication unit 170 may be made using various light sources. The position indication unit 170 may include a device configured to emit light that a person can visibly recognize. For example, the position indication unit 170 may include a light-emitting diode (LED) device, a laser diode, or a line laser module configured to emit visible light that a person can visibly recognize. In the present embodiment, the position indication unit 170 may be implemented by a line laser module. As illustrated in FIG. 3, the line laser module 1701 may be configured such that light (laser beam) 1702 emitted by a laser diode is output in a line form. In addition, the position indication unit 170 may be implemented by an LED device and may be one selected from a red LED, a green LED, and a blue LED. The position indication unit 170 is provided for emitting light that the user can visibly recognize, and is not limited to the line laser module, the laser diode, or the LED device.

When the user touches a selected position with his or her finger, the position indication unit 170 assists the user to recognize the position of his or her finger. For example, when the user puts his or her finger in the space spaced apart from the display device 300, it is difficult for the user to accurately determine whether the position of his or her finger is located in the sensing space where the touch sensing unit 160 can sense the finger of the user. This is because the light source used in the X-axis transmission module 120 of the touch sensing unit 160 may not be recognized by eyes of the user. For example, an infrared light source may be used as the light source. In this case, the infrared light source may not be recognized by the user.

Therefore, the position indication unit 170 emits visibly recognizable light, and the visibly recognizable light is irradiated on the finger of the user when the finger of the user is put at a specific position, whereby the user can recognize the position of his or her finger. For example, the position of the finger of the user may be a position spaced apart from the display device 300 by a predetermined distance.

The finger of the user has been described as an example in the present embodiment, but any object may be used as long as the object can cause a change in transmission and reception of infrared signals. The object may be a pen besides the finger (or hand) of the user.

The position indication unit 170 may interoperate with the X-axis transmission module 120 and the X-axis reception module 110 of the touchscreen device 100. That is, when the X-axis transmission module 120 emits infrared light, the position indication unit 170 may be set to emit visible light.

In such a case, the visible light emitted by the position indication unit 170 may hinder the user from viewing an image displayed on the display device 300, or may cause unnecessary power consumption. Therefore, the position indication unit 170 may set to selectively operate (emit the visible light) only when the touch of the user is sensed.

For example, when the finger of the user is located between the X-axis transmission module 120 and the X-axis reception module 110, the control unit 150 may sense the finger of the user and operate a position indication unit driver to drive the position indication unit 170. When the finger of the user is out of the sensing region between the X-axis transmission module 120 and the X-axis reception module 110, the control unit 150 may stop the operation of the position indication unit 170.

In addition, the position indication unit 170 may include a plurality of light-emitting devices. When the finger of the user is located between the X-axis transmission module 120 and the X-axis reception module 110, the control unit 150 may operate all the light-emitting devices, or may operate some of the plurality of light-emitting devices so that the visible light is irradiated on only a region adjacent to the finger of the user.

The display device 300 may be supported by a display device supporter 330. Various electronic components for driving the display device 300 may be mounted inside the display device supporter 330.

A support member 320 may be connected to the display device supporter 330. The X-axis transmission module 120, the X-axis reception module 110, and the position indication unit 170 may be installed in the support member 320.

In the present embodiment, the support member 320 may be connected to a rear side of the display device supporter 330. That is, the display device 300 is disposed in front, the display device supporter 330 is disposed on a rear side of the display device 300, and the support member 320 is connected to a rear side of the display device supporter 330. Therefore, the support member 320 may be disposed spaced apart from a front side or a lateral side of the display device supporter 330 or the display device 300.

In addition, a front position indication unit 173 may be disposed in the support member 320. The front position indication unit 173 may be disposed to emit light in the same direction as that of the front side of the display device 300. In the support member 320, a portion where the front position indication unit 173 is disposed may be made of a diffusion plate or a translucent plate. In this case, the front position indication unit 173 may include an LED device.

In such an arrangement, when the touch sensing unit 160 senses the finger of the user, the front position indication unit 173 emits light, and the user sees the light emitted by the front position indication unit 173.

Therefore, even though the light is not irradiated on the finger of the user, the user can know that the front position indication unit 173 around the display device 300 is turned on. Hence, the user can recognize that the position of his or her finger is within the region where the touch sensing unit 160 can sense the finger.

Figure 4:
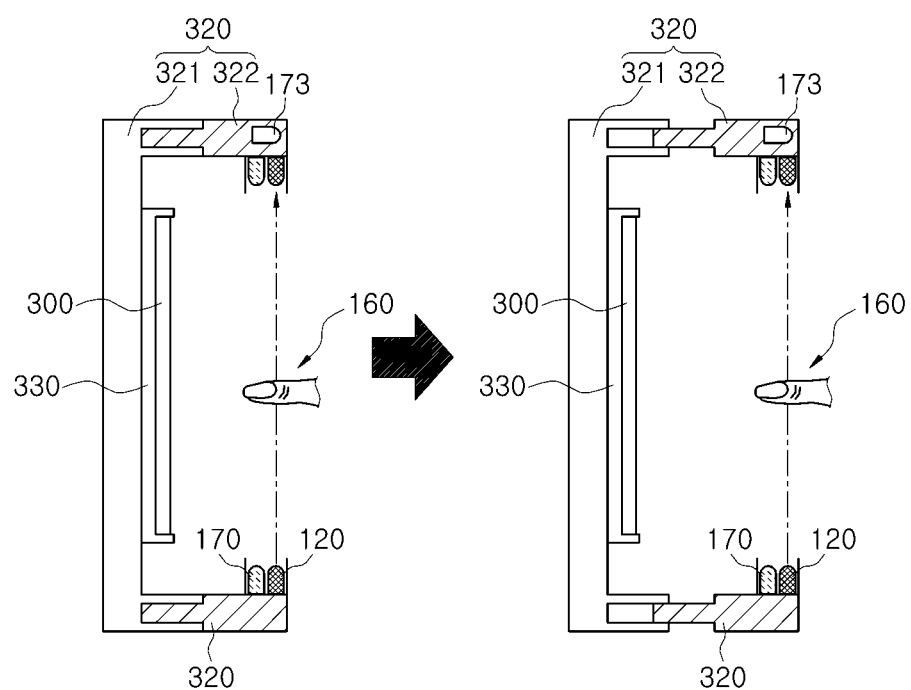
FIG. 4 is a sectional view for describing a touchscreen device, a method for controlling the same, and a display apparatus, according to another embodiment.

FIG. 4 is a sectional view for describing a touchscreen device, a method for controlling the same, and a display apparatus, according to another embodiment.

Referring to FIG. 4, a support member 320 includes a first support member 321 and a second support member 322.

The second support member 322 may be slidably connected to the first support member 321 A touch sensing unit 160 may include an X-axis transmission module 120 and an X-axis reception module 110, and a position indication unit 170 may be disposed between the touch sensing unit 160 and a display device 300. A distance of the touch sensing unit 160 and the position indication unit 170 from the display device 300 may be variable.

Therefore, a position at which a finger of a user is sensed may be adjusted with respect to the surface of the display device 300 in an Z-axis direction according to physical characteristics or habit of the user. In the present embodiment, the first support member 321 and the second support member 322 are illustrated as being connected to each other by the slidable structure, but the position of the second support member 322 may be changed by various mechanisms, for example, a stepping motor.

Figure 5:
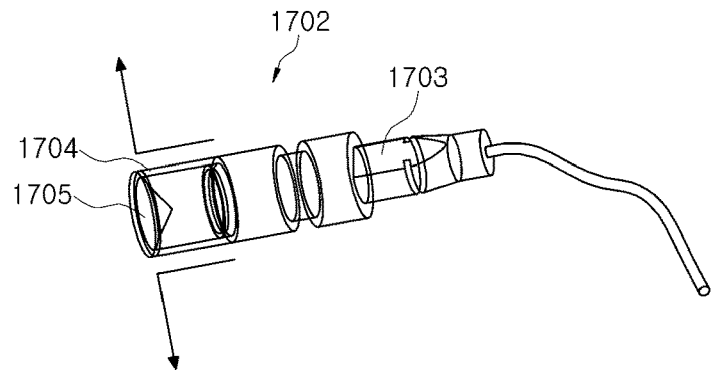
FIG. 5 is a diagram for describing a line laser module in the touchscreen device, according to another embodiment.
Figure 6:
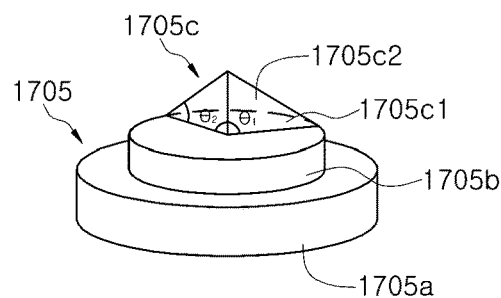
FIG. 6 is a diagram for describing a structure of a reflection member in the line laser module of the display apparatus, according to another embodiment.

FIG. 5 is a diagram for describing a line laser module in the touchscreen device, according to another embodiment, and FIG. 6 is a diagram for describing a structure of a reflection member in the line laser module of the display apparatus, according to another embodiment.

FIGS. 5 and 6, a line laser module 1702 according to another embodiment may include a laser module 1703 that emits a laser beam, a reflection member 1705 that reflects the laser beam emitted by the laser module 1703 at an angle of 90 degrees, and a light-transmissive support member 1704 that connects and supports the reflection member 1705 to the laser module 1703 and transmits the laser beam emitted by the laser module 1703 and reflected by the reflection member 1705.

That is, unlike the line laser module 1701 of FIG. 3 that emits a laser beam in a line form due to a refraction of a laser beam passing through a lens such as a cylindrical lens, the line laser module 1702 according to the present embodiment emits a laser beam at various angles of, for example, 270 degrees, 180 degrees, or 90 degrees, according to the shape of the reflection member 1705 while the laser beam emitted by the laser module 1703 is reflected by the reflection member 1705 at an angle of 90 degrees.

That is, the reflection member 1705 may include a reflection surface 1705c2 inclined at an angle of 45 degrees with respect to a traveling direction of the laser beam emitted by the laser module 1703.

The reflection surface 1705c2 of the reflection member 1705 may be formed by removing a part of a conical reflection surface. For example, when a cone having a circular bottom surface is called a 360-degree cone, the reflection member 1705 according to the present embodiment has the conical reflection surface 1705c2 of an angle less than 360 degrees, for example, a 90-degree cone whose bottom surface 1705c1 has a 90-degree fan shape, a 180-degree cone whose bottom surface 1705c1 has a 180-degree fan shape, or a 200-degree cone whose bottom surface 1705c1 has a 200-degree fan shape, so that the laser beam emitted by the laser module 1703 is reflected and emitted in a constant angle range.

The light-transmissive support member 1704 may be made of a synthetic resin or a glass material to have a hollow cylindrical shape or a pipe shape. Due to the light-transmissive support member 1704, the reflection member 1705 is spaced apart from the laser module 1703 and the laser beam is emitted to a space defined between the reflection member 1705 and the laser module 1703.

Referring to FIG. 6, the reflection member 1705 may include a first bottom plate 1705a having a first diameter so as to be connected to the light-transmissive support member 1704, a second bottom plate 1705b having a second diameter smaller than the first diameter of the first bottom plate 1705a, and a reflection plate 1705c disposed on the second bottom plate 1705b.

The reflection member 1705 may be made of a metal material having high reflectivity and high strength. The laser beam emitted by the laser module 1703 may be reflected by the second bottom plate 1705b and travel in a direction in which the laser module 1703 is disposed, or may be reflected by the reflection plate 1705c at an angle of 90 degrees and emitted to the outside.

The reflection plate 1705c may have a bottom surface 1705c1, a reflection surface 1705c2, and a lateral surface that connects the bottom surface 1705c1 to the reflection surface 1705c2.

The bottom surface 1705c1 of the reflection plate 1705c may be formed to have a fan shape with a certain angle. The bottom surface 1705c1 of the reflection plate 1705c is illustrated as having a fan shape with a first angle θ1, and the first angle θ1 is about 90 degrees.

The reflection surface 1705c2 of the reflection plate 1705c may be inclined at a second angle θ2 with respect to the bottom surface 1705c1. In the present embodiment, the second angle θ2 is about 45 degrees.

Although separate reference numeral is not assigned for avoiding confusion, the lateral surface of the reflection plate 1705c vertically connects both ends of the reflection surface 1705c2 to the bottom surface 1705c1.

Figure 7:
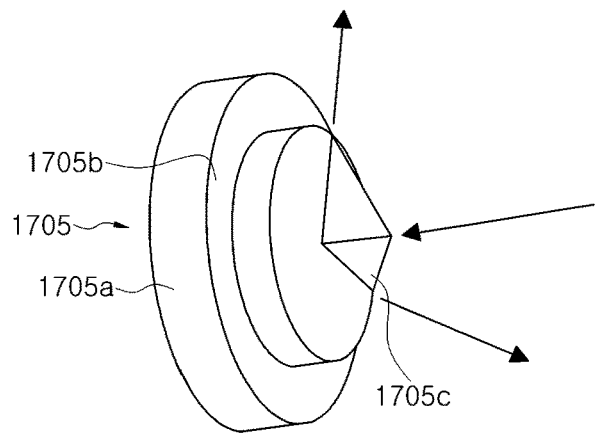
FIGS. 7 and 8 are diagrams illustrating an example of the reflection member in the line laser module of the display apparatus, according to an embodiment.
Figure 8:
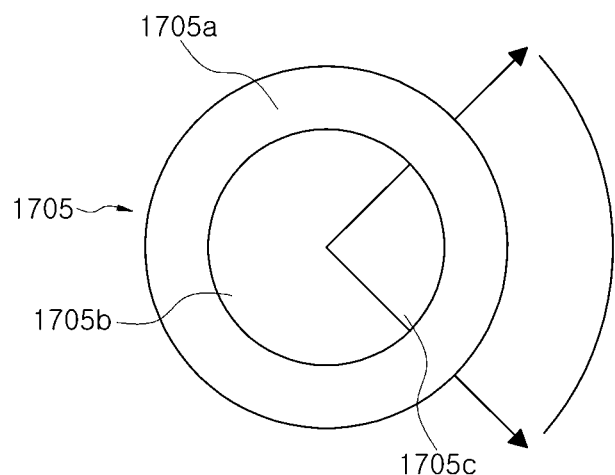

FIGS. 7 and 8 are diagrams illustrating an example of the reflection member in the line laser module of the display apparatus, according to an embodiment Referring to FIGS. 7 and 8, the reflection member 1705 may be disposed in a traveling direction of the laser beam and may selectively reflect the laser beam emitted by the laser module 1703 at an angle of 90 degrees. That is, the laser beam emitted by the laser module 1703 is reflected to a plane perpendicular to the traveling direction of the laser beam.

The reflection plate 1705c of the reflection member 1705 has a reflection surface that reflects the laser beam at an angle of 90 degrees, and the bottom of the reflection surface has a 90-degree fan shape.

Figure 9:
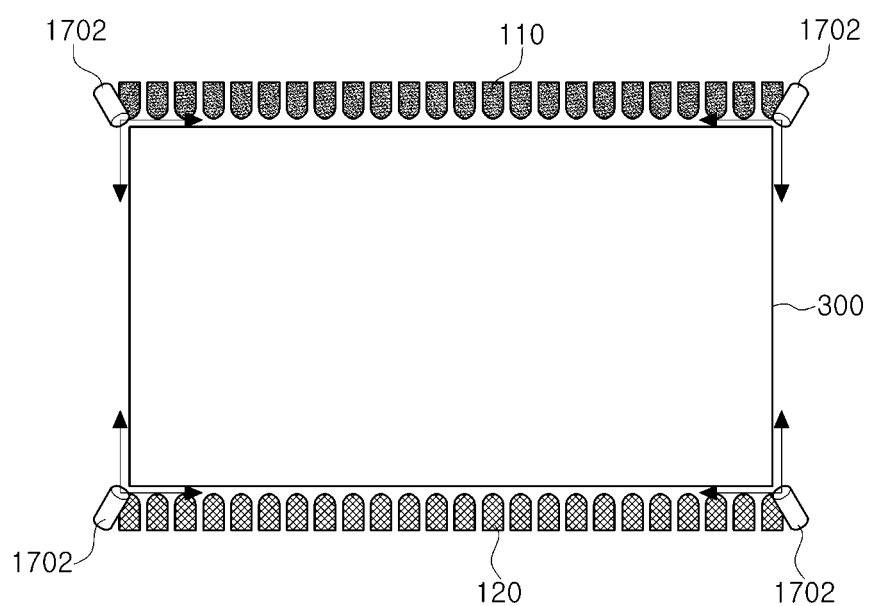
FIG. 9 is a diagram illustrating an example in which four line laser modules are installed as position indication units in the display apparatus, according to an embodiment.

FIG. 9 is a diagram illustrating an example in which four line laser modules are installed as position indication units in the display apparatus, according to an embodiment.

Referring to FIGS. 2 and 9, the display apparatus according to the present embodiment includes the display device 300 and the touch sensing unit 160. The touch sensing unit 160 includes the X-axis transmission module 120 and the X-axis reception module 110 in front of the display device 300. As an embodiment of the position indication unit 170, the line laser module 1702 is disposed between the touch sensing unit 160 and the display device 300.

The line laser module 1702 may include a plurality of line laser modules so that a light screen covers an entire screen region of the display device 300. For example, four line laser modules 1702 may be disposed at edges of the display device 300.

The line laser modules 1702 may emit laser beams in an angle range of 90 degrees so that the light screen covers the entire screen region of the display device 300.

Figure 10:
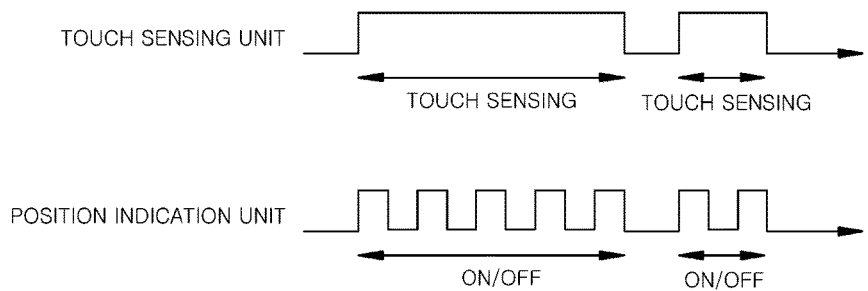
FIG. 10 is a diagram for describing operations of a touch sensing unit and a position indication unit in the display apparatus, according to an embodiment.

FIG. 10 is a diagram for describing operations of the touch sensing unit and the position indication unit in the display apparatus, according to an embodiment.

According to the present embodiment, the position indication unit 170 may operate only when the touch sensing unit 160 is sensing a hand of a user or an object, and may be turned on and off for visible recognition.

A general line laser module used as a position indication unit emits constant light without being turned on and off during operations. However, according to the present embodiment, the line laser module 1702 performs an on/off operation enough to be visibly recognized, whereby the user can intuitively know that his or her hand or an object is within the sensing region. In addition, since the line laser module 1702 performs the on/off operation, it is possible to further extend the lifespan of the line laser module 1702 than the case of emitting the constant light.

For example, the line laser module 1702 is turned on and off in the range of about 1 Hz to about 100 Hz, and preferably in the range of about 20 Hz to about 80 Hz for easier visible recognition.

That is, when the touch sensing unit 160 senses a motion of a user, the position indication unit 170 may be turned on and off according to a corresponding sensing signal.

An on/off frequency of the position indication unit 170 may have a correlation with a motion of a hand of a user or an object. When the touch sensing unit 160 senses that the motion of the hand of the user or the object becomes faster, the control unit 150 may control the position indication unit 170 to increase the on/off frequency. When the touch sensing unit 160 senses that the motion of the hand of the user or the object becomes slower, the control unit 150 may control the position indication unit 170 to decrease the on/off frequency.

Since the control unit 150 controls the operation of the position indication unit 170 according to the motion of the user so that a motion speed of the user is within an appropriate range, the user may recognize the motion speed.

In addition, the position indication unit 170 may adopt the line laser modules configured to emit light of various colors, and may drive the line laser modules 1702 to emit light of different colors according to the motion speed of the user, thereby making it easy to adjust the motion speed of the user to be within an appropriate range.

Figure 11:
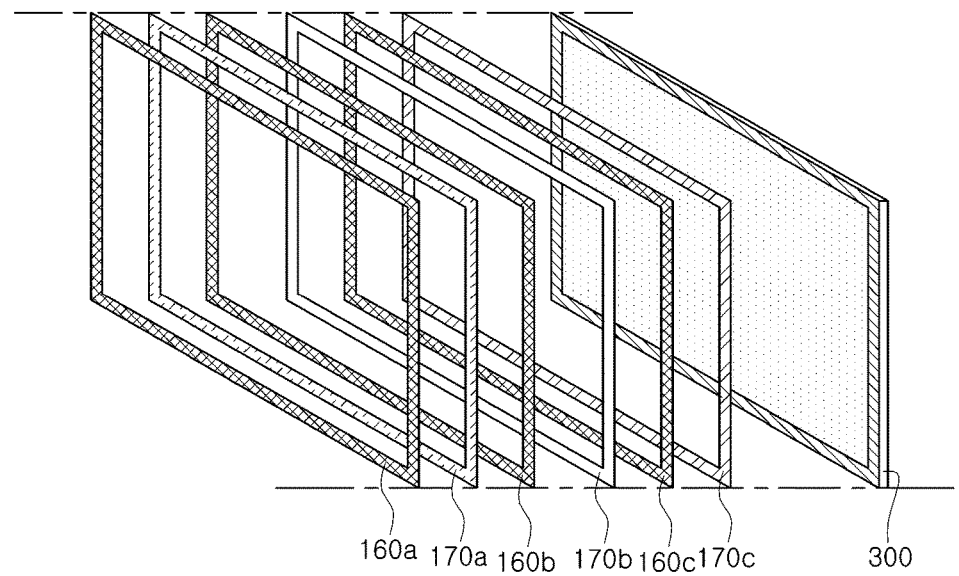
FIG. 11 is a diagram illustrating a touchscreen device including a plurality of touch sensing units and a plurality of position indication units, according to an embodiment.

FIG. 11 is a diagram illustrating a touchscreen device including a plurality of touch sensing units and a plurality of position indication units, according to an embodiment.

Referring to FIG. 11, the touchscreen device according to the present embodiment may include a first touch sensing unit 160a and a first position indication unit 170a at a first position in front of the display device 300, and a second touch sensing unit 160b and a second position indication unit 170b at a second position. The touchscreen device according to the present embodiment may further include a third touch sensing unit 160c and a third position indication unit 170c at a third position in front of the display device 300.

That is, the first touch sensing unit 160a is disposed at the first position, and the second touch sensing unit 160b is disposed at the second position spaced apart from the first position. The first position indication unit 170a is disposed between the first position and the second position, and the second position indication unit 170b is disposed spaced apart from the first position indication unit 170a, with the second touch sensing unit 160b being disposed therebetween. In addition, the third touch sensing unit 160c is disposed at the third position spaced apart from the second touch sensing unit 160b, with the second position indication unit 170b being disposed therebetween, and the third position indication unit 170c is disposed spaced apart from the second position indication unit 170b, with the third touch sensing unit 160c being disposed therebetween.

The first position may be further spaced apart from the display device 300 than the second position, and the second position may be further spaced apart from the display device 300 than the third position.

That is, the touchscreen device according to the present embodiment may include a plurality of touch sensing units and a plurality of position indication units.

The first position indication unit 170a may be disposed between the first touch sensing unit 160a and the display device 300, the second position indication unit 170b may be disposed between the second touch sensing unit 160b and the display device 300, and the third position indication unit 170c may be disposed between the third touch sensing unit 160c and the display device 300.

The first position indication unit 170a may be disposed between the first touch sensing unit 160a and the second touch sensing unit 160b, the second position indication unit 170b may be disposed between the second touch sensing unit 160b and the third touch sensing unit 160c, and the third position indication unit 170c may be disposed between the third touch sensing unit 160c and the display device 300.

The first, second, and third position indication units 170a, 170b, and 170c may include light sources that emit visible light of the same color, or may include light sources that emit visible light of different colors. For example, the first position indication unit 170a, the second position indication unit 170b, and the third position indication unit 170c may include a red light source, a green light source, and a blue light source, respectively. When the first, second, and third position indication units 170a, 170b, and 170c emit light of different colors, the user can intuitively recognize a depth of his/her touch position (a distance spaced apart from the display device 300).

Similarly, the first, second, and third position indication units 170a, 170b, and 170c may operate with the first, second, and third touch sensing units 160a, 160b, and 160c, or may operate only when the first, second, and third touch sensing units 160a, 160b, and 160c sense the finger of the user or the object. All or part of the light sources respectively included in the first, second, and third position indication units 170a, 170b, and 170c may operate.

The first, second, and third touch sensing units 160a, 160b, and 160c may selectively or simultaneously operate according to the position of the finger of the user or the object.

For example, when the finger of the user moves from the first position to the second position, the first touch sensing unit 160a senses the position selected by the user (touch position), and then, when the second touch sensing unit 160b senses the finger of the user, the first touch sensing unit 160a stops operating and the second touch sensing unit 160b senses the position selected by the user. Similarly, when the finger of the user moves from the second position to the third position, the second touch sensing unit 160b senses the position selected by the user (touch position), and then, when the third touch sensing unit 160c senses the finger of the user, the second touch sensing unit 160b stops operating and the third touch sensing unit 160c senses the position selected by the user. In such a case, it is possible to obtain the effect similar to the moving of the touch sensing unit.

According to setting, it is possible to sense the position selected by the user while all the first, second, and third touch sensing units 160a, 160b, and 160c are operating. The control unit senses the touch position according to signals sensed by the first, second, and third touch sensing units 160a, 160b, and 160c.

In addition, the first, second, and third touch sensing units 160a, 160b, and 160c may be provided for receiving different types of operation instructions for inputting different commands or functions.

For example, in a case where the user inputs a command to a computer by using a mouse, a cursor moves on a display screen when the user moves the mouse, and a click or a double-click is input according to the number of times to press a button of the mouse. Similarly, the first touch sensing unit 160a may be provided for inputting a cursor move command, and the second touch sensing unit 160b may be provided for inputting a click command. In addition, the third touch sensing unit 160c may be provided for inputting a double-click command.

Furthermore, the second touch sensing unit 160b or the third touch sensing unit 160c may be provided for inputting a command for returning a current screen to a previous screen on the display device 300 or a command for displaying a home screen.

The signals sensed by the first, second, and third touch sensing units 160a, 160b, and 160c are controlled as different commands or functions by the control unit 150.

That is, the display apparatus according to the present embodiment may include a plurality of touch sensing units that are respectively disposed at different distances from the display device. Signals, which are respectively input to the touch sensing units, may be different types of commands.

Accordingly, the user can input various types of commands according to a touch depth (distance from the display device).

According to one or more embodiments, it is possible to provide a touchscreen device having a novel structure, a method for controlling the same, and a display apparatus.

In addition, it is possible to provide a touchscreen device capable of sensing a position selected by a user without touching a display device with a finger of the user, a method for controlling the same, and a display apparatus.

Furthermore, it is possible to provide a touchscreen device allowing a user to more easily recognize a position of a sensing region and a motion of an input operation, a method for controlling the same, and a display apparatus.

Moreover, it is possible to provide a touchscreen device allowing a user to input different types of commands through a plurality of touch sensing units, a method for controlling the same, and a display apparatus.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a touchscreen device;
an information processor configured to calculate and process a signal sensed by the touchscreen device; and
a display device disposed spaced apart from the touchscreen device and configured to display an image according to an output signal of the information processor,
wherein the touchscreen device comprises:
a touch sensing unit comprising a transmission module configured to transmit a touch measurement signal and a reception module configured to receive the touch measurement signal from the transmission module, wherein the touch sensing unit is disposed spaced apart from the display device;
a control unit configured to calculate coordinates of a position selected by an user by processing an output signal received from the reception module of the touch sensing unit;
a position indication unit disposed between the touch sensing unit and the display device and configured to emit visibly recognizable light; and
a support member configured to support the touch sensing unit and the position indication unit,
wherein when the touch sensing unit senses a motion of the user in a sensing region, the control unit controls the position indication unit to emit light that is turned on and off to be visibly recognizable.

2. The display apparatus of claim 1, wherein the position indication unit comprises a line laser module.

3. The display apparatus of claim 2, wherein the line laser module comprises:
a laser module configured to emit a laser beam;
a reflection member configured to reflect the laser beam at an angle of 90 degrees; and
a light-transmissive support member configured to connect and support the reflection member to the laser module and transmit the laser beam emitted by the laser module and reflected by the reflection member.

4. The display apparatus of claim 3, wherein the line laser module is turned on and off in the range of about 1 Hz to about 100 Hz.

5. The display apparatus of claim 4, wherein the support member comprises a first support member and a second support member, the second support member is slidably connected to the first support member, and when the second support member moves, the touch sensing unit and the position indication unit move at the same time.

6. The display apparatus of claim 1, wherein when the touch sensing unit senses a change in a motion speed of the user, the control unit controls the position indication unit to change an on/off frequency or a color of the light.

7. The display apparatus of claim 1, wherein the touch sensing unit comprises a first touch sensing unit and a second touch sensing unit respectively disposed at a first position and a second position and configured to receive different types of operation commands.

8. The display apparatus of claim 7, wherein a sensing region of the first touch sensing unit is parallel to a sensing region of the second touch sensing unit.

9. The display apparatus of claim 7, wherein the position indication unit comprises a first position indication unit and a second position indication unit, and the first position indication unit and the second position indication unit comprise light sources configured to emit visible light of different colors.

* * * * *